United States Patent [19]

Lewis, Jr. et al.

[11] Patent Number: 4,700,923
[45] Date of Patent: Oct. 20, 1987

[54] UNIVERSAL, PORTABLE, CONCRETE SLAB BASE FOR PUMP JACKS

[76] Inventors: Irvin H. Lewis, Jr.; Charles W. Lewis, both of 3980 S. 2500 East, Vernal, Utah 84078

[21] Appl. No.: 496,121

[22] Filed: May 19, 1983

[51] Int. Cl.⁴ ............................................. F16M 1/00
[52] U.S. Cl. .................................... 248/679; 248/680; 248/500
[58] Field of Search .................. 52/710; 248/679, 680, 248/500, 678, 681, 673; 72/705, 679, 680

[56] References Cited

U.S. PATENT DOCUMENTS

| | | | |
|---|---|---|---|
| 1,430,931 | 10/1922 | Blackall | 52/710 |
| 2,836,219 | 5/1958 | Pertner | 72/705 |
| 2,998,216 | 8/1961 | Hurd | 248/679 |
| 3,495,431 | 2/1970 | Landon | 72/705 |
| 3,623,353 | 11/1971 | Dinerman | 72/705 |
| 3,877,671 | 4/1975 | Underwood | 248/499 |
| 4,014,151 | 3/1977 | Erhart | 52/710 |
| 4,291,570 | 9/1981 | Whitney | 72/705 |
| 4,315,393 | 2/1982 | Schack | 52/710 |
| 4,408,940 | 10/1983 | Fischer | 248/679 |

FOREIGN PATENT DOCUMENTS 775941  5/1957  United Kingdom ................ 248/680

Primary Examiner—Reinaldo P. Machado
Assistant Examiner—Alvin Chin-shue
Attorney, Agent, or Firm—M. Reid Russell

[57] ABSTRACT

A universal, portable base for heavy equipment, such as pump jacks, has a substantially rectangular slab of reinforced concrete with three rails extending longitudinally from end-to-end thereof substantially equally spaced apart. Anchor slides fit over the rails and can be moved along the rails to appropriate positions for receiving tie-down devices for securing heavy equipment to the base.

The base includes networks of reinforcing steel bars extending longitudinally and transversally of the base intermediate its thickness with one network being secured to the longitudinal rails.

9 Claims, 11 Drawing Figures

UNIVERSAL, PORTABLE, CONCRETE SLAB BASE FOR PUMP JACKS

BACKGROUND OF THE INVENTION

1. Field

The invention is in the field of concrete slab supporting bases for receiving and anchoring heavy power-driven equipment, specifically pump jacks as placed adjacent to oil wells.

2. State of the Art

Portable concrete slab bases for receiving and anchoring pump jacks have been developed in the past and have been used extensively. One of the drawbacks to these has been the fact that they have been built so that each accommodates only a single or a limited number of different sizes and types of pump jacks. There has been no universally applicable pump jack base.

3. Objective

A principal objective in the making of the invention was to provide a concrete slab base for pump jacks that can accommodate practically any of the sizes and types of commercially available pump jacks, so that, during production from a given oil well by pumping, a larger size pump and pump jack can be installed when necessary without first removing the original base, followed by installation of a new base specially made for the larger pump jack, and so that a single base has universal application as to pump types, either with respect to all lengths or with respect to different types of pumps within a given length, i.e. twenty-four feet, twenty-eight feet, or forty feet in length.

SUMMARY OF THE INVENTION

In accordance with the invention, a reinforced concrete base for transport to the required site is cast top-side-up at a production plant in a form structure that is easily removed after the concrete is set. The resulting base is provided with three equally-spaced-apart rails in the form of I-beams or equivalent structural lengths extending longitudinally from end-to-end of the base, with the lower flanges and lower part of the web firmly embedded in the concrete and the upper flanges and upper part of the web free within respective longitudinal recesses opening into the upper face and into the opposite end faces of the concrete slab. The upper flanges of the I-beams are substantially flush with or slightly lower than the upper face of the slab and their opposite ends are exposed at the opposite open ends of the longitudinal recesses, so as to receive anchoring slides. Such slides are provided with longitudinal slots at and centrally along their undersides, which slots are expanded laterally interiorly of the bodies of the slides for fitting onto and over the exposed rail portions of the I-beams, so as to slide therealong to selected adjusted positions conforming to the tie-down requirements of the particular pump jack. Each has an internally threaded opening extending downwardly from its upper surface for receiving an externally threaded tie-down element.

Outboard of the three rails, intermediate the length of the slab and at the opposite sides thereof within corresponding recesses, are respective short rails for use when the pump jack is a Lufkin Air Balance. The recesses are sufficiently long to permit installation of anchor slides.

The form structure is of rectangular formation open at the top and bottom and has end walls separable from longitudinal side walls. The usual form wedges are preferably used for fastening such walls together during the pouring and setting of the concrete and for freeing such walls from one another when the form is to be removed after the concrete is set.

Means are provided for supporting the three I-beams in appropriate relative positions within the form during the concrete casting operation and the subseqent setting of the concrete, and for supporting paired lengths of angle irons in channel formation about the respective I-beams as form structure for the longitudinal recesses within which the upper portions of the I-beams are freely exposed. Such angle irons may remain as part of the slab base or may be loosened and removed with the remainder of the form structure after the concrete is set.

The reinforcement for the concrete slab base is preferably made up of networks of reinforcing bars extending longitudinally and transversly of the interior of the form, a lower one being supported by blocks resting on the pouring surface on which the form is placed and an upper one being supported by and secured to the three I-beams, preferably by passing the transverse bars through holes in the webs of the three I-beams.

Preferably, the pouring surface is provided by a permanently placed concrete slab deck of size sufficient to receive and support the form structure. Its upper surface, which receives the poured concrete, may be covered with a plastic film or other suitable material capable of providing for free parting of the cast slab therefrom.

The form structure is placed top-side-up, with the upper flanges of the I-beams substantially flush or slightly below the open top of the form structure so that the finished base is top-side-up upon removal of the form structure.

In providing for the relatively short, outboard rails at respectively opposite sides of the group of three rails, individual box forms are positioned about relatively short I-beam lengths supported on the pouring surface by suitable blocks. These blocks are preferably upstanding lengths of I-beams that remain in the concrete slab as cast. The short I-beams are also preferably secured to the upper network of reinforcing bars.

To provide for drainage channels leading from the outboard recesses, lengths of pipe extend from the respective outboard form boxes to the respective side walls of the form structure.

THE DRAWINGS

In the accompanying drawings, which represent the best mode presently contemplated for carrying out the invention:

FIG. 1 is a view in perspective looking down on the top side of a pump jack base conforming to the invention and from one corner thereof;

FIG. 2, a transverse, vertical section taken on the line 2—2 of FIG. 1;

FIG. 3, a fragmentary, transverse, vertical section taken through one of the three rails of the base of the preceding figures and drawn to a larger scale, with an anchor slide in position on the rail and shown in elevation;

FIG. 4, a top plan view of the fragmentary portion of the base shown in FIG. 3;

FIG. 5, a view corresponding to that of FIG. 1, but showing a portion of a pump jack anchored in position on the base;

FIG. 6, a transverse, vertical section taken on the line 6—6 of FIG. 5, but showing the transverse tie-down piece and the externally threaded tie-down elements in elevation;

FIG. 7, a fragmentary, transverse section taken on the line 7—7 of FIG. 5;

FIG. 8, a transverse, vertical section through the form structure used in casting the concrete slab base of the preceding figures, the section being taken along the inside face of an end wall of such form structure;

FIG. 9, a fragmentary, top plan view taken along the line 9—9 of FIG. 8;

FIG. 10, a horizontal section taken along the line 10—10 of FIG. 8, an intermediate portion being broken away for convenience of illustration; and, FIG. 11, a corresponding longitudinal section taken along the line 11—11 of FIG. 8.

DETAILED DESCRIPTION OF THE ILLUSTRATED EMBODIMENT

Figure 1:
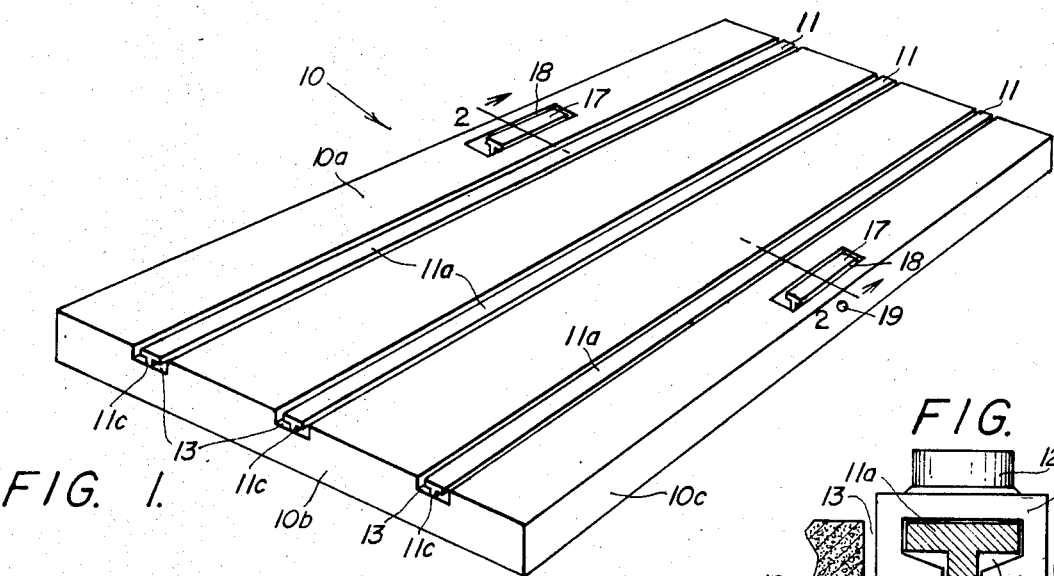

In its illustrated form, the pump jack base comprises a reinforced concrete slab 10 of rectangular configuration, having a top side 10a for receiving a pump jack or similar equipment, opposite end faces 10b, respectively, and opposite side faces 10c, respectively.

Equally spaced apart in slab 10 are three structural steel I-beams designated 11, respectively, extending longitudinally of the slab from end-to-end thereof. The upper surfaces of their upper flanges 11a are perferably slightly below (⅛-inch) slab top side 10a and serve as rails for slidably receiving anchor slides 12, FIGS. 3, 4, 6, and 7. Their bottom flanges 11b and lower portions of their webs 11c are embedded in the concrete of the slab, but the upper flanges 11a and upper portions of the webs 11c are freely exposed within respective longitudinal recesses 13 that extend from end-to-end of the slab and open into the opposite end faces 10b of the slab.

Each of the anchor slides 12 is formed to receive and slide back and forth on any one of the rails 11a and to be attached or detachable only by being slid on or off the rail at either end thereof. For this purpose, each is formed with longitudinal slot 14 at and extending centrally along its underside, which slot is expanded laterally interiorly of the body of the slide, as at 14a, so the slide will fit onto and over the exposed rail portion of an I-beam 11. It is preferably formed with an upstanding boss member 12a, which has an internally threaded opening 15 therethrough for receiving in screw engagement the lower end of an externally threaded tie-down element 16, FIG. 5, preferably a selected length of so-called "all thread" rod.

For accommodating a Lufkin Air Balance, which has a wider tie-down structure in the form of outriggers at an intermediate location along its length than other pump jacks, the slab 10 is provided with a pair of relatively short (e.g., thirty inch) I-beams 17 located approximately centrally of its length outboard of the group of three rails 11 at opposite sides thereof between the outer rails and the side faces 10c of the slab. These have their lower flanges and lower portions of their webs embedded in the concrete and their upper flanges and upper portions of their webs freely exposed in short longitudinal recesses 18 in a manner similar to that of the I-beams 11, the recesses 18 being sufficently longer than the I-beams 17 at either or both ends thereof to provide for placing anchor slides 12 on the exposed rail portions thereof. Drainage from the otherwise closed box recesses 18 is provided for by drain pipes 19 opening at respective side faces 10c of the slab.

Figure 10:
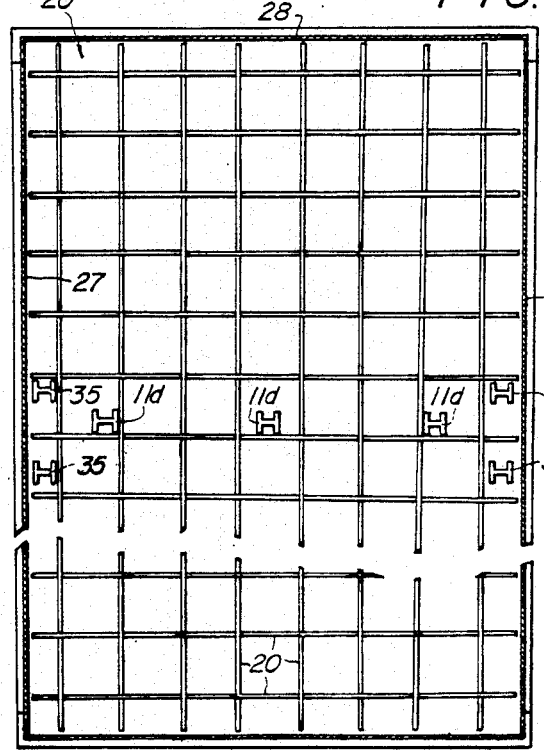
Figure 11:
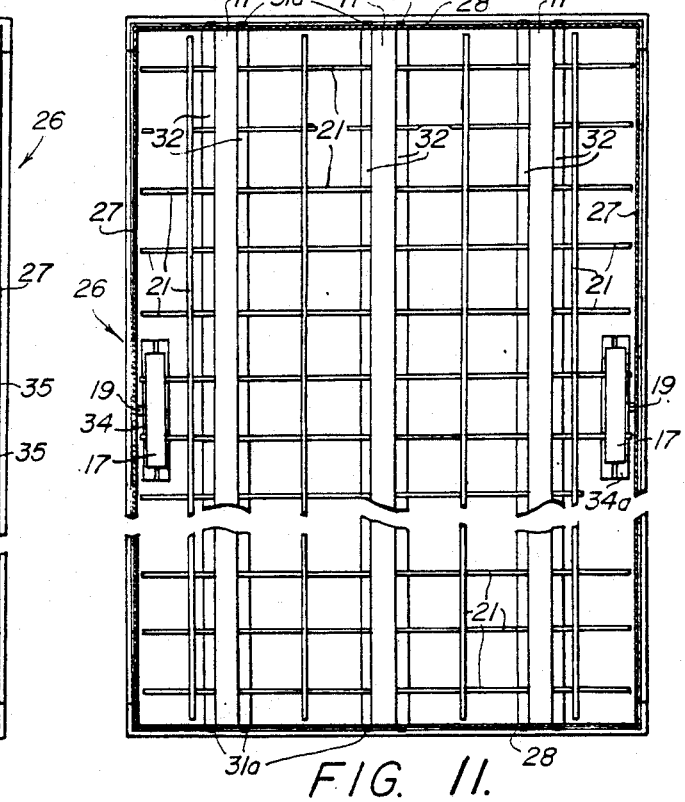

Concrete slab 10 is reinforced preferably by the usual reinforcing steel bars formed into networks 20 and 21, FIGS. 8, 10, and 11, of longitudinally and transversely extending bars, the network 20 being intermediate the thickness of the slab below I-beams 11, preferably made up in one foot squares, and the network 21 being immediately above the bottom flanges 11b of such I-beams, as shown in FIG. 10, with the transverse rods extending through holes drilled in the webs of the I-beams. The bars of the network are held in position relative to one another in the usual manner, by wire ties (not shown).

The pump jack base of the invention should have a length of forty feet to be truly universal in accepting all sizes of pump jacks, but may be made in lengths of twenty-four or twenty-eight feet to conserve material in those instances in which it is unlikely that a longer length will ever by required. Its thickness will normally be one foot and its overall width eight feet, with the rails 11a twenty-eight inches apart center-to-center and symmetrically grouped on the slab.

Figure 5:
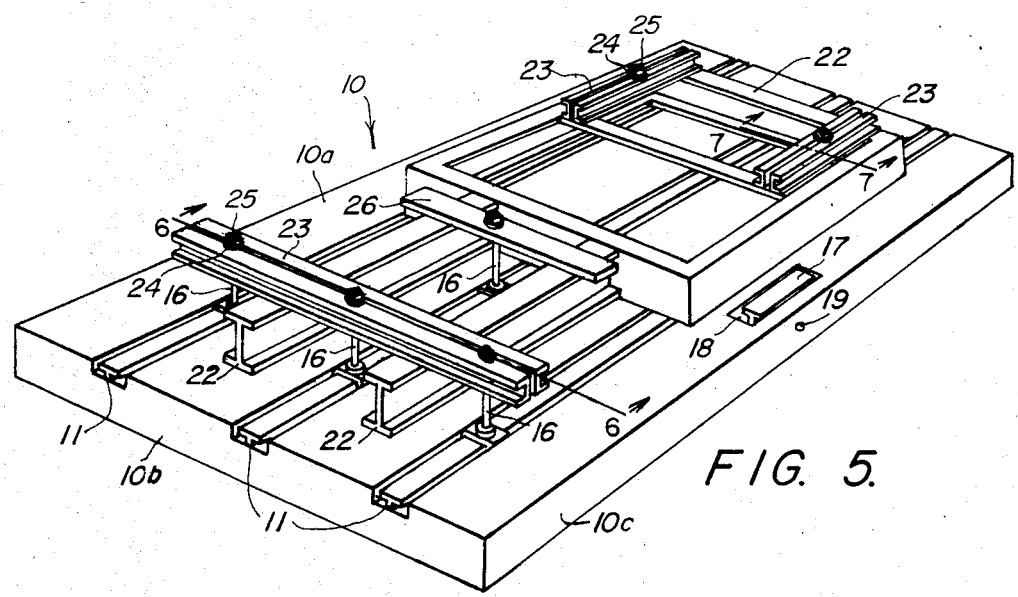
Figure 6:
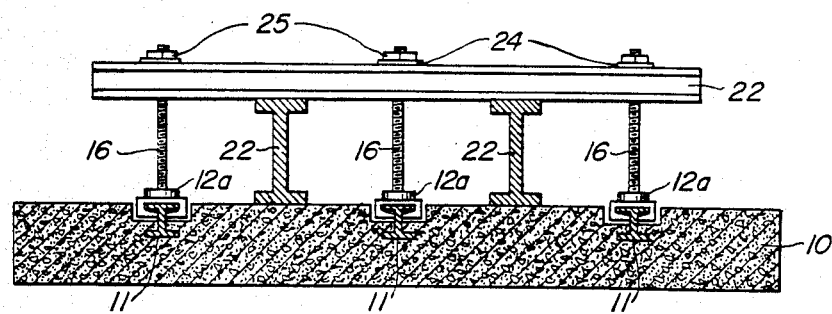
Figure 7:
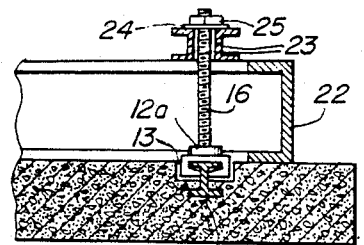

Pump jacks are of various dimensions and styles, the one shown partially (only the T-base frame of the pump jack is shown) in FIG. 5 as 22 being typical. So-called "tie-downs" are customarily employed for anchoring purposes. In accorance with the invention, elongate tie-downs 23 are fabricated from structural channels fastened together back-to-back with spacers at intervals therebetween leaving spaces through which the tie-down elements 16 are passed screwing into the bosses 12a of anchor slides 12. Washers 24, FIGS. 6 and 7, are placed on the upper ends of the elements and nuts 25 are cinched down tightly when the tie-downs are appropriately placed across pump jack structure, either transversely or longitudinally as shown in FIG. 5.

A somewhat different form of tie-down is shown at 26, 23a indicative of what may be employed where something different is called for. As shown, the tie-downs may be secured to a single rail, to two of the rails, or to all three of the rails 11.

Figure 9:
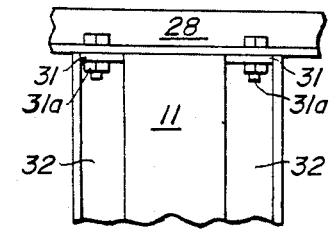

The concrete for the slab 10 is poured into a rectangular form 26 prepared for the purpose, with the I-beams and reinforcement networks properly placed. Such form 26 preferably comprises longitudinal side walls 27, FIGS. 8, 9, and 10, and end walls 28 temporarily attached together in the usual manner, with form wedges (not shown) arranged to separate such walls following setting of the concrete. The form as so constituted, with open top and bottom, is placed top-side-up on a smooth supporting surface 29, usually the top of a supporting slab of concrete somewhat larger than the form structure, which is covered with a thin plastic film (not shown) or other material insuring parting of the cast slab from the surface on which it is cast.

Figure 8:
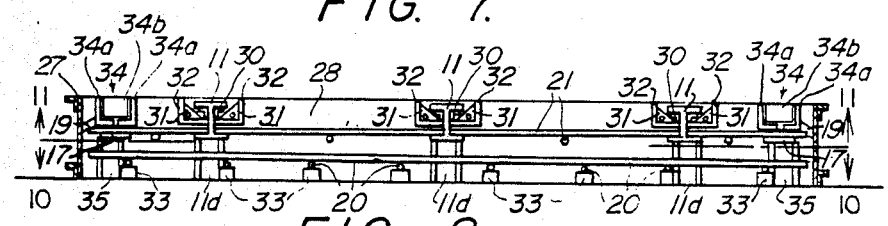

I-beams 11 are supported at proper positions in form 26 by short pieces 30, FIG. 8, of structural steel angle welded to the inner face of each form end wall 28. Corner plates 31 are welded in the opposite ends of pairs of structural steel angles 32 so that the angles can be secured to the frame by bolts 31a in confronting relationship at opposite sides of the webs 11c of respective I-beams 11 as forms for the recesses 13 to be left free of concrete during the pouring operation. The use of bolts 31a in the manner described strengthens the overall forms during the pouring and vibrating of the concrete, yet the angles 32 can be easily unbolted for the removal of the form and removal of the angles after the concrete has set. The I-beams are supported along their length as necessary to prevent sagging by short lengths of I-beams 11d standing on end. With a slab up to about twenty-eight feet in length, one such support 11d at about the center of each beam 11 has been found satisfactory. With longer bases, additional supports are necessary. The transverse pieces of reinforcing bar 21 pass through holes drilled in the webs of beams 11 and, preferably, at least about one-third of the reinforcing bars are welded to I-beams 11. The lower reinforcing network 20 is placed upon a number of blocks 33 to position it at the proper height within form 26.

The relatively short I-beams 17 are made part of small box forms 34 which are dimensioned to provide the necessary free space around I-beams 17 for positioning of anchor slides 12 thereon. I-beams 17 may be arranged in various ways to insure proper anchorage of such I-beams in the concrete slab, for example, as shown, by passing several of the transverse pieces of reinforcing bars 21 through the web of such beams and welding or otherwise securely fastening them to the I-beams. Such box forms 34 are supported at the proper height within form 26 by blocks 35, FIG. 2, conveniently in the form of appropriate short lengths of I-beams standing on end. The steel angles 34a which form part of the forms 34 extend about two inches beyond the ends of I-beam 17 as shown in FIG. 11, with a block of material such as wood or styrofoam, shown at 34b, FIG. 8, inserted between the angles 34a at the ends of I-beam 17 to keep the concrete from such ends. Angles 34a can be spot-welded to the webs of I-beams 17 so that they can be easily removed after the concrete sets.

To provide the drains 19 from the otherwise closed, box-like spaces within which are the rails 17, short lengths of pipe (usually one inch O.D.) extend through respective receiving openings at the bottoms of box forms 34 and to the inner wall faces of the respective sidewalls 27 of form 26.

Figure 2:
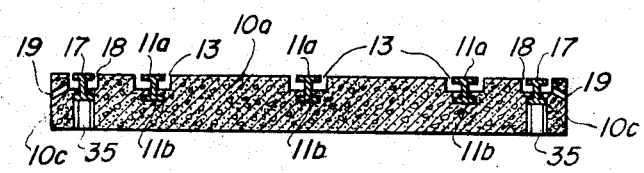
Figure 3:
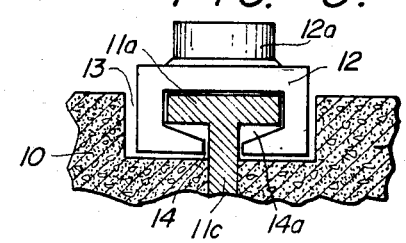
Figure 4:
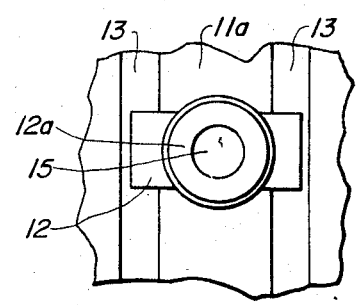

A high-grade concrete mix is poured into form structure 26 and vibrated in suitable manner to insure a dense and strong body. The upper surface is screed in the usual manner, taking care to leave the protected recesses free of concrete. After the concrete is set and cured for a suitable time period, the side and end walls 27 and 28 are separated in the usual manner and removed, leaving the finished slab base as shown in FIGS. 1 and 2. The structural angles 32 may or may not be left as part of the finished slab base. As illustrated, they have been removed for use in forming other units.

It should be noted that the finished base of the invention is top-side-up as cast and need merely be lifted onto the flat bed of a truck or rail car for transportation to the well site.

Some pump jobs will require tie-down only to the center rail 11, others only to the outside rails, and others to only two mutually adjacent rails of the group of three provided by the base.

Whereas this invention is here illustrated and described with specific reference to an embodiment thereof presently contemplated as the best mode of carrying out such invention in practice, it is to be understood that various changes may be made in adapting the invention to different embodiments without departing from the broader inventive concepts disclosed herein and comprehended by the claims that follow.

We claim:

1. In combination, a universal, portable base comprising a substantially rectangular slab of reinforced concrete having three structural I-beams extending longitudinally from end-to-end thereof substantially equally spaced apart, with their upper flanges substantially flush with the upper surface of the slab and the lower portions of the webs embedded in the concrete, there being respective longitudinal smooth walled recesses, which recess walls are equidistant from one another extending from end-to-end of the slab and open at the ends within which the upper flanges and upper portions of the webs of the I-beams and the ends thereof are freely exposed as rails, said flange ends spaced essentially equidistant from said longitudinal recesses walls; anchor slide means for the reception and adjustable positioning along each said I-beam flange, in clearance with said longitudinal recess walls; means for providing said longitudinal recesses with smooth essentially equidistant walls; a pump jack mounted on said base; anchor slides at selected locations on one or more of said rails as required by the particular type of pump jack; structural tie-downs positioned for fastening the pump jack to said anchor slides; and externally threaded tie-down elements passed through said tie-downs and having their lower ends threaded into said anchor slides and nuts on their upper ends cinched down upon said tie downs.

2. A universal, portable base for heavy equipment such as pump jacks according to claim 1, additionally comprising a pair of relatively short I-beams positioned, respectively, outboard of the three I-beams at opposite sides thereof between the outer of the three and the longitudinal sides of the slab intermediate the length thereof embedded in the slab in corresponding recesses as similar rails for receiving anchor slides for a Lufkin Air Balance.

3. A universal, portable base for heavy equipment such as pump jacks according to claim 1, wherein the reinforcing for the concrete comprises networks of reinforcing steel bars extending longitudinally and transversly of the slab intermediate the thickness thereof.

4. A universal, portable base for heavy equipment such as pump jacks according to claim 3, wherein one of the reinforcing networks is positioned intermediate the bottom of the slab and the bottoms of the I-beams and the other of said networks is secured to the I-beams.

5. A universal, portable base for heavy equipment such as pump jacks according to claim 4, wherein the other of the networks is secured to the I-beams by the transverse steel bars thereof passing through holes in said I-beams.

6. A universal, portable base for heavy equipment such as pump jacks according to claim 1, wherein said anchor slides are positioned on the exposed, rail portions of the I-beams, each of said slides having a relatively narrow groove extending from end-to-end of its underside and expanded laterally internally of the slide for receiving the upper flanges and adjoining portion of the web of an I-beam so as to be anchored thereto, but free to slide along the rail, and having an internally threaded boss projecting upwardly from its upper surface for receiving an externally threaded tie-down element.

7. A universal, portable base for heavy equipment such as pump jacks according to claim 6, wherein said structural tie-downs extend across or along rail portions of the I-beams, each of said tie-downs having externally threaded tie-down elements passed therethrough at positions along its length for screw engagement with the internally threaded bosses of respective anchor slides and provided with respective nuts for tightly cinching said tie-downs in position.

8. A universal, portable base for heavy equipment such as pump jacks according to claim 1, wherein the means for providing the longitudinal recesses with smooth walls that are essentially equidistant from one another consist of pairs of steel angles each to extend the length of the portable base; and means for securing the steel angle ends relative to the I-beam ends where said steel angles are spaced essentially equidistant from one another along their length during concrete pouring.

9. A universal, portable base for heavy equipment such as pump jacks according to claim 8, wherein the means for securing the steel angle ends relative to the I-beam ends are corner plates that are each holed and secured across the ends of the steel angles to receive fasteners therethrough that releasably connect each steel angle end to an end wall of a form wherein the portable base is formed.

* * * * *